United States Patent Office 3,319,747
Patented May 16, 1967

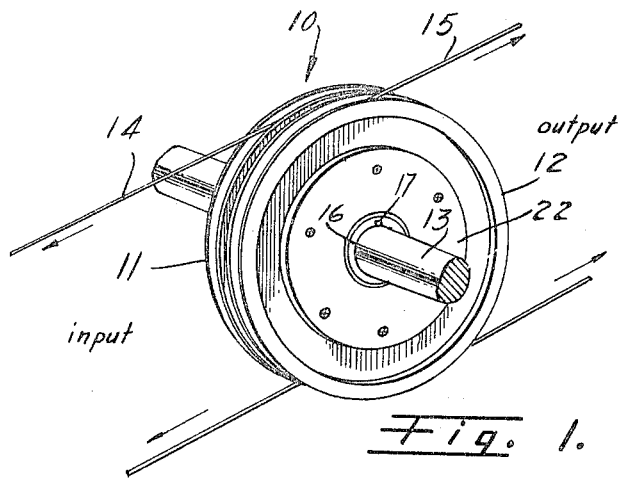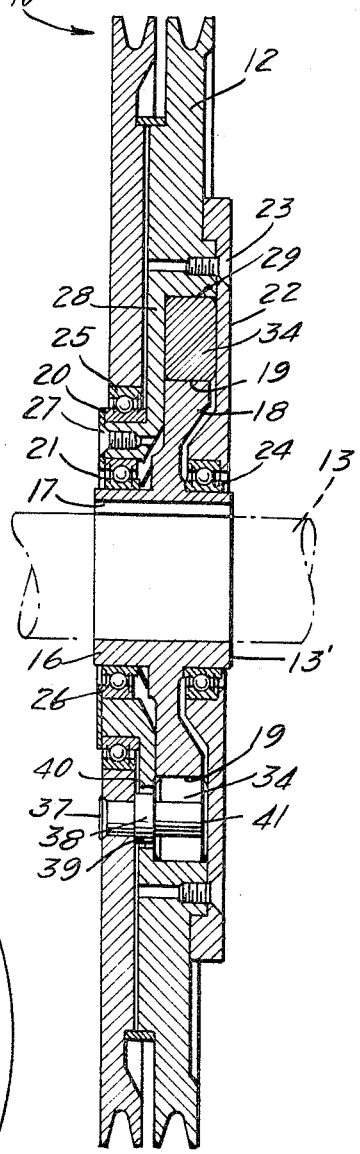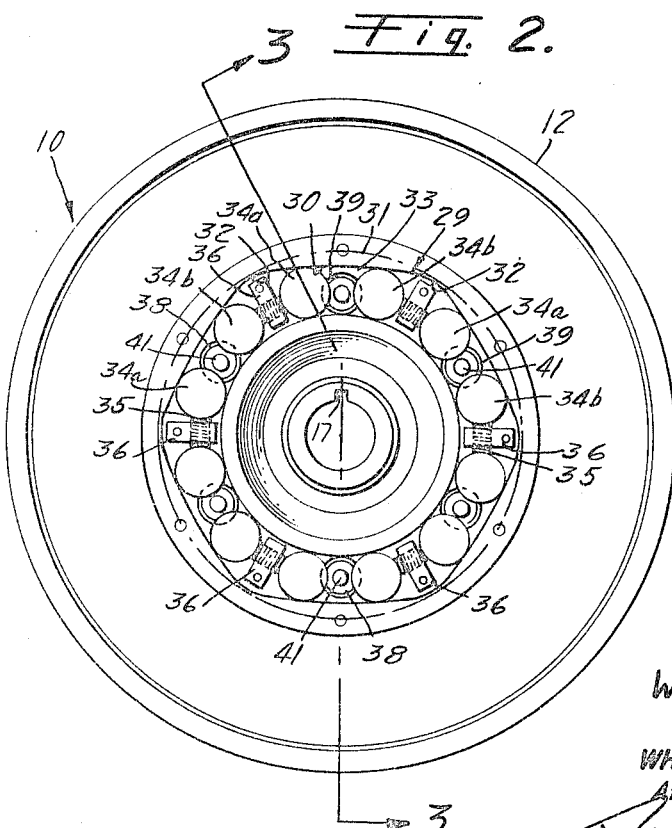

3,319,747
LOST MOTION DRIVE WITH ANTI-FEED BACK BRAKE
Warner R. Lauper, San Pedro, Calif., assignor to Adams Rite Manufacturing Company, Glendale, Calif., a corporation of California
Filed Feb. 15, 1965, Ser. No. 432,581
7 Claims. (Cl. 192—8)

The present invention relates generally to devices for transmitting torque from a rotatable input member to a rotatable output member, and is more particularly concerned with an irreversible rotary clutch unit in which an output member will be automatically locked and released with respect to a supporting member in dependence upon the non-movement and movement of the input member relative to the output member.

It is one object of the herein described invention to provide a compact self-contained unit in which the input, output and clutching mechanism are physically so arranged as to permit greater flexibility of adaptation to different installation requirements.

A further object is to provide a unitary construction for devices of the foregoing character such that one or more units may be mounted on a common support such as a shaft in a manner which will allow the use of different types of actuators for the primary input and output. For example, the actuator may take the form of a sheave, lever, etc.

Thus, the devices of the present invention can be economically untlized to meet the requirements of such control systems as require the use of several individual irreversible devices on a common shaft which can be rotated by a servo drive or manually to operate the devices in unison, while each device may be overridden through its individual primary input.

A still further object is to provide an irreversible clutch unit in which the input and output have a limited lost motion driving connection and are rotatably supported on a central support which may be fixed or rotatable as the use requires, and when rotatable may serve as a secondary input which will have an angular rotation greater than the lost motion limits, without impairing or damaging the device.

Further object of the invention will be brought out in the following part of the specification, wherein detailed description is for the purpose of fully disclosing the invention without placing limitations thereon.

Referring to the accompanying drawings, which are for illustrative purposes only:

FIG. 1 is a perspective view schematically showing a clutching unit embodying the features of the present invention;

FIG. 2 is an enlarged end view of the unit as seen from the right end in FIG. 1, portions being removed to disclose details of the internal clutching mechanism; and FIG. 3 is a substantially diametral sectional view, taken substantially on line 3—3 of FIG. 2.

Referring more specifically to the drawings, the irreversible rotary clutch unit of the present invention is shown, for illustrative purposes, as comprising in general a compact unit as generally indicated at 10 in FIG. 1 as primarily including an input member 11 in the form of a sheave, and an output member 12 in the form of a sheave. These sheaves are in confronting relation and suppported upon a central member 13 as a shaft.

It is within the broad concepts of the present invention that the input and output members may assume different physical constructions and may embody actuating levers and other types of movable members. Also, the central support member may be in the form of a rotatable shaft, a fixed shaft or tubular support, or other suitable central supporting member for the purpose. As illustrated, the input and output members may be connected for remote actuation by any suitable arrangement, and in the case of sheaves may be coupled to remote actuators, for example, by flexible input cable 14, and output cable 15. While the input member 11 may be regarded as a primary input, the construction in the present unit permits of the central member being utilized, when required, as a secondary input. Thus, when a plurality of the units are mounted on a common shaft, this shaft may be rotated by a servo drive or manually to operate the outputs of the respective devices in unison, while each device may be overridden through its individual input.

As best shown in FIG. 3, the central support may include a unitary construction, or may incorporate a separate member 13' with hub 16 arranged with a key slot 17 or other means by which it may be secured to a shaft or fixed member. Between the hub ends, the member is provided with a radial flange 18 having a circular surrounding surface 19 at its periphery.

The input and output members 11 and 12 are illustrated as being sheaves. The construction of these members may vary, but in the present disclosure have been shown as sheaves which are in compact confronting relation, and which are rotatably supported upon the hub 16. The sheave 12 comprises an annular body which is consaructed on one side with an annular end flange 20 which is internally associated with anti-friction bearing means 21 on one side of the radial flange 18. The opposite end of the output member is shown as comprising an end plate 22 which is secured near its periphery by a plurality of securing screws 23 to the boly of the sheave. As shown, the end plate is of annular construction and at its central opening is arranged to be supported upon antifriction bearing means 24 positioned on the opposite side of the radial flange 18. The bearings 21 and 24 thus provide a stable bearing support for the sheave which constitutes the output member.

The sheave which forms the input member 11 is rotatably supported at its central opening upon anti-friction bearing means 25 which outwardly surround and are supported upon the end flange 20. A retaining ring 26 holds the anti-friction bearing means 21 and 25 in position, this retaining ring being secured by means of screws 27 having threaded engagement with the end flange 20. As thus arranged, it will be observed that the sheaves provide easily accessible input and output members, and that these sheaves cooperatively enclose and form a housing for the radial flange 18 of the central support.

As shown in FIG. 3, the right end of the sheave forming the output member 12 is annularly recessed to provide a cavity for the clutching mechanism and for receiving the periphery of the flange 19 therein. This cavity is formed by an inner end wall 28 of reduced thickness, a circumferentially surrounding wall as generally indicated at 29 as being outwardly spaced from the circular surface 19, and the end wall formed by end plate 22.

As best shown in FIG. 2, the wall 29 is multisided and is provided with a plurality of circumferentially angularly spaced elongate flat or slightly curved surface areas 30 which are formed substantially as chords of a locus circle as indicated at 31. The adjacent ends of these surface areas are in spaced apart relation and interconnected by curved surface areas 32. As thus arranged, the wall 29 cooperates with the circular surface 19 to form an annular cavity 33 which surrounds the radial flange 18 and provides a plurality of sections for receiving the various clutching instrumentalities which will now be described.

Mounted in the annular cavity 33 are a plurality of sets of wedging locking members, each set being shown as comprising two rollers 34a and 34b which are respectively disposed at the ends of each surface area 30. These rollers are of such diameter, that they will wedgingly lock the radial flange 18 and output member 12 against relative movement, when moved towards each other.

The rollers are normally urged into wedging locking position by means of compression springs 35 which are supported by a retaining bracket 36 in the space between the rollers 34a and 34b of adjacent sets, so that the ends of the springs normally bear against these rollers to push them apart into wedging locking position between their associated surface area 30 and the adjacent area of circular surface 19. As thus far described, it will be apparent that due to the wedging locking action of the rollers 34a and 34b, the output member and central support will be held against relative movement.

In the disclosed embodiment of the invention, the input and output members are interconnected through a lost motion driving connection which is shown as comprising a plurality of pins 37 on the input member 11 at such positions as to have its axis between the two rollers of each set. The pin 37 has a circumferentially extending flange portion 38 in each case which is positioned within an opening 39 in the inner end wall 28, this opening being defined by a circular wall 40 in outward spaced relation to the outer surface of the flange portion so as to permit limited lost motion relative movement between the input and output members before the members become direct connected for unitary movement. The pin 37 further includes a projecting end 41 which extends between the rollers 34a and 34b of each roller set. The clearance between the end 41 and the adjacent rollers is made less than the lost motion clearance of the flange portion 38 so that during initial lost motion movement of the input member, the end 41 will first act to release the roller lying in the path of movement resulting from movement of the input member in either direction of its rotation.

From a consideration of the foregoing description, it will be apparent that several types of operations are readily obtainable from the unit of the present invention, for example:

(1) With the center support fixed, movement of the input member in either direction will release the locking member in the path of movement of the the pin end 41, while the other locking member will roll along out of its wedging position and permit movement of the input member into direct driving connection with the output member.

(2) With the input member and output member both held against movement, the central support cannot be moved in either direction due to the locking action of the locking members.

(3) With the input member held in fixed position, movement of the central support will be possible, since its movement in either direction will carry the effective locking member into engagement with the pin end 41 and thus release its clamping action to permit further movement of the support member. During this action the other locking member will roll out of its locking position.

It is believed that it will be apparent from the foregoing description that the objects and advantages of the herein described invention will be carried out and accomplished.

Various modifications may suggest themselves to those skilled in the art without departing from the spirit of my invention, and, hence, I do not wish to be restricted to the specific form shown or uses mentioned except to the extent indicated in the appended claims.

I claim:

1. An irreversible enclosed compact clutch unit, comprising:
    (a) a central support having a circumferentially extending surface;
    (b) an input member and an output member rotatable on said central support, said members having confronting inner faces and outer end portions respectively positioned on opposite sides of said surface;
    (c) wedging locking means rotatably positioned between said outer end portions cooperable with said surface and a radially outwardly positioned surface of said output member for automatically locking said output member and support against relative movements; and
    (d) members carried by said input member for initially releasing said locking means in response to movement of the input member in either of its directions of rotation and thereafter establish a direct driving connection between the input and output members, when a rotative force is applied to the input member.

2. An irreversible enclosed compact clutch unit, comprising:
    (a) a central support having a circumferentially extending surface;
    (b) an input member and an output member rotatable on said support and forming a housing therefor;
    (c) wedging locking means enclosed by said housing rotatably positioned between said surface and a radially outwardly positioned surface of said output member for automatically locking said output member and support against relative movements; and
    (d) a lost motion driving connection between said input and output members including members carried by the input member for unwedging the locking means as a result of initial relative movement of the input and output members and upon continued relative movement thereof establish a direct drive between the input and output members.

3. An irreversible clutch unit, comprising:
    (a) a central support having a circumferentially extending radial flange between its ends;
    (b) an input member and an output member supported for rotation on said central support on bearings positioned on opposite sides of said flange;
    (c) wedging locking means rotatably positioned between said flange and said output member for automatically locking said output member and said support against relative movement; and
    (d) a lost motion driving connection between said input and output members including means carried by the input member for unwedging the locking means as a result of initial relative movement of the input and output members.

4. An irreversible clutch unit, comprising:
    (a) a central support having a circumferentially extending radial flange between its ends;
    (b) an input member and an output member supported for rotation on said central support on bearings positioned on opposite sides of said flange;
    (c) wedging locking means rotatably positioned between concentric surfaces respectively carried by said flange and said output member for automatically locking said output member and said support against relative movements; and
    (d) a lost motion driving connection between said input and output members including means carried by the input member for unwedging the locking means as a result of initial relative movement of the input and output members.

5. An irreversible compact clutch unit, comprising:
    (a) a central support having a circumferentially extending radial flange between its ends;
    (b) an input sheave and an output sheave rotatably supported for rotation on said central support on bearings positioned on opposite sides of said flange, said sheaves extending outwardly beyond said flange and substantially enclosing it;
    (c) wedging locking means rotatably positioned between said flange and a surrounding part of said output sheave for automatically locking said output sheave with respect to said support; and
    (d) a lost motion driving connection between said sheaves including means for unwedging the locking means as a result of initial relative movements between said sheaves.

6. A device of the character described, comprising:
(a) a central support having a surrounding circular surface;
(b) an output member rotatably mounted on said central support, said output member having a bearing flange at one end cooperable with said support and a recess at its other end, said recess being closed by a fixedly secured bearing plate cooperable with said support, and said recess having a wall surrounding and outwardly spaced from said circular surface to cooperatively form therewith an annular cavity between said bearing flange and said bearing plate, said wall containing a plurality of circumferentially spaced elongate wall surface areas having their adjacent ends in spaced relation;
(c) sets of two locking members each in said cavity and comprising a locking member interposed between each end of the respective wall surface areas and the adjacent portion of said circular surface;
(d) means resiliently urging the locking members of each set towards each other into a wedging locking position;
(e) a rotatable input member in confronting relation to the output member, said input member having a bearing support on the bearing flange of the output member;
(f) a lost motion driving connection between said input and output members; and
(g) means carried by the input member for unwedging one of the locking members of each of said sets as a result of initial relative movement of the input and output members.

7. A device according to claim 6, wherein the lost motion connection and unwedging means comprises a plurality of pins carried by said input member, said pins respectively loosely extending through openings in said output member to positions between and out of contact with the respective locking members of each of said sets, whereby one of the locking members of each of said sets will be unwedged upon initial relative movement of said input member in either of its directions of rotation, and upon further relative movement thereof will establish a direct driving connection with said output member.

References Cited by the Examiner
UNITED STATES PATENTS

| | | | |
|---|---|---|---|
| 1,385,785 | 7/1921 | Hofer et al. | |
| 2,509,541 | 5/1950 | Suska | 192—8 |
| 3,243,023 | 3/1966 | Boyden | 192—8 |

BENJAMIN W. WYCHE, III, *Acting Primary Examiner.*